(12) United States Patent
Challa (10) Patent No.: US 6,707,865 B2
(45) Date of Patent: Mar. 16, 2004

(54) DIGITAL VOLTAGE GAIN AMPLIFIER FOR ZERO IF ARCHITECTURE

(75) Inventor: Raghu Challa, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 40 days.

(21) Appl. No.: 09/954,589

(22) Filed: Sep. 14, 2001

(65) Prior Publication Data

US 2003/0011423 A1 Jan. 16, 2003

Related U.S. Application Data

(60) Provisional application No. 60/305,968, filed on Jul. 16, 2001.

(51) Int. Cl.⁷ .............................................. H04L 27/08
(52) U.S. Cl. ...................................................... 375/345
(58) Field of Search ......................... 375/345; 381/321; 330/291, 293

(56) References Cited

U.S. PATENT DOCUMENTS 4,546,321 A * 10/1985 Bateman et al. ............ 327/334
5,014,013 A * 5/1991 Kotzian ...................... 327/346
5,600,581 A 2/1997 Dworkin et al.
5,642,305 A 6/1997 Pan et al.
5,982,427 A * 11/1999 Hunt et al. ................. 348/254
6,345,285 B1 2/2002 Nagao et al.

FOREIGN PATENT DOCUMENTS

EP 0626763 5/1994
WO 0139546 5/2000

OTHER PUBLICATIONS

Patent Abstracts of Japan, Publication No. 11212768, Logarithmic value calculation circuit. Jun. 8, 1999.

* cited by examiner

Primary Examiner—Don N. Vo
(74) Attorney, Agent, or Firm—Philip Wadsworth; Charles D. Brown; Donald Kordich (57) ABSTRACT

The invention is directed toward a digital VGA that is implemented in the logarithmic domain. The digital VGA exploits logarithmic properties to replace a complex multiplier of a conventional digital VGA with a simple and inexpensive adder. Moreover, additional techniques are described to significantly reduce the size of one or more lookup tables (LUTs) implemented within the digital VGA. In this manner, the invention can realize a simple, low cost digital VGA.

16 Claims, 10 Drawing Sheets

DIGITAL VOLTAGE GAIN AMPLIFIER FOR ZERO IF ARCHITECTURE

This application claims priority from U.S. Provisional Application Serial No. 60/305,968, entitled "DIGITAL VOLTAGE GAIN AMPLIFIER IMPLEMENTATION IN LOGARITHMIC DOMAIN IN THE ZERO IF ARCHITECTURE," filed Jul. 16, 2001, the content of which is incorporated herein by reference in its entirety. Co-pending and commonly assigned U.S. application Ser. No. 09/954,760 entitled "LOGARITHMIC LOOKUP TABLES" filed the same day as this application, and bearing Attorney Docket No. 010420 is also hereby incorporated herein by reference in its entirety.

FIELD

The invention relates generally to wireless communication systems and, more particularly, to voltage gain amplifiers within wireless communication systems.

BACKGROUND

One common technique used in wireless communication is code division multiple access (CDMA) signal modulation in which multiple communications are simultaneously conducted over a radio-frequency (RF) spectrum. Some example wireless communication devices that have incorporated CDMA technology include cellular radiotelephones, PCMCIA cards incorporated within computers, personal digital assistants (PDAs) equipped with wireless communication capabilities, and the like.

A conventional architecture for a CDMA receiver includes a radio-frequency (RF) section and an infrared (IF) section. In particular, the received RF signals are typically filtered in the RF section, converted from RF signals to IF signals for further filtering and scaling by a voltage gain amplifier (VGA) in the IF section, and finally converted to baseband signals. The baseband signals are typically passed through an analog-to-digital (A/D) converter to produce digital samples which can be sent to a digital signal processor for tracking and demodulation.

The Zero infrared frequency (Zero IF) architecture is a more recent architecture used in CDMA wireless communication devices. Unlike other conventional architectures, the Zero IF architecture converts incoming RF signals directly into baseband signals without first converting the RF signals to IF signals. In particular, the Zero IF architecture makes use of a digital VGA that scales the digital samples produced by the A/D converter. In this manner, the Zero IF architecture eliminates the need for various IF components, including an IF mixer, an IF VGA and IF filters.

In the heterodyne architecture with an IF section, the IF-VGA controlled by an automatic gain control unit (AGC) is responsible for either expanding or compressing the signal such that it fits in the relatively narrow dynamic range of the A/D converter. The A/D converter can then produce small bit-width (typically 4 bits) numbers so that rest of the hardware that performs signal processing can be simplified. In the Zero-IF architecture however, due to the absence of the IF VGA, the A/D converter is typically designed to have much larger dynamic range resulting in large bit-width numbers at the output.

Although the Zero IF architecture eliminates the need for IF components, the architecture may require more complicated baseband components, primarily due to the relatively large digital signals (typically 18 bits) generated by the A/D converter. Consequently, a digital VGA is implemented at baseband to scale the large bit-width signals from the A/D converter. The Zero IF architecture may implement a relatively wide multiplier (typically an 18-bit by 18-bit multiplier) to scale the large digital signals. In addition, the digital VGA typically includes a relatively large lookup table (LUT) (often exceeding a kilobyte or more) to convert values received from the AGC unit from logarithmic units in decibels (dB) to linear values for controlling the gain of the digital VGA. In operation, for example, the digital VGA multiplies the linear digital signals received from the A/D converter by a linear gain value obtained from the LUT. For these reasons, wireless communication devices incorporating the Zero IF architecture may have significant cost even though the IF components have been eliminated.

SUMMARY

In general, the invention is directed toward a digital voltage gain amplifier (digital VGA) that operates within the logarithmic domain. In particular, the digital VGA scales digital input values in accordance with logarithmic gain values. Among other advantages, properties of the logarithmic domain are exploited to replace the complex multiplier of a conventional VGA with a simple and relatively inexpensive adder. Additional techniques are described to significantly reduce the size of one or more LLTTs implemented within the digital VGA. In this manner, the invention can realize a much more simple, lower cost design of a digital VGA.

Although not so limited, the digital VGA is particularly useful within CDMA wireless communication devices that incorporate the Zero IF architecture. The invention greatly simplifies the manner in which relative large digital signals can be processed, reducing the complexity, memory space and cost of the wireless communication device. Other non-CDMA Zero-IF architectures can also benefit from the invention.

In one embodiment, the invention comprises a digital voltage gain amplifier. The amplifier may include a logarithmic conversion unit that converts a baseband signal from a linear domain to a logarithmic domain and an adder that sums the converted baseband signal with a gain signal to produce a scaled baseband signal. In addition, the amplifier may include an exponential conversion unit that converts the scaled baseband signal from the logarithmic domain to the linear domain.

In another embodiment, the invention comprises a wireless communication device. For example, the wireless communication device may include an antenna that receives an RF signal and an RF mixer that generates a baseband signal from the RF signal. In addition, the wireless communication device may include the voltage gain amplifier described above to scale the baseband signal. The wireless communication device may also include digital signal processor that processes at least part of the scaled baseband signal in the linear domain.

In still other embodiments, the invention may comprise one or more methods. For example, a method may include converting a baseband signal from a linear domain to a logarithmic domain, and adding the converted baseband signal to a gain to generate a scaled baseband signal. The method may also include converting the scaled baseband signal from the logarithmic domain to the linear domain. The conversions may utilize lookup tables. Additional techniques can be used to reduce the size of the lookup tables and thus reduce memory requirements.

In yet another embodiment, the invention can avoid the use of a multiplier in a digital VGA. For example, a multiplication function followed by optional truncation can be performed by first converting the two inputs to be multiplied into the logarithmic domain. The input signals can then be added or subtracted in the logarithmic domain before being converted back to a linear domain with just enough bits to mimic the original truncation operation.

The invention can provide a number of advantages. For example, the invention can provide a more simple, lower cost design of a digital VGA for use in Zero IF architecture. In particular, the invention may eliminate the need for a complex and relatively expensive multiplier, which can be replaced with a much more simple and inexpensive adder. In addition, because the inventive amplifier operates in the logarithmic domain, the need to convert the gain values to a linear domain can be simplified, or avoided altogether. In one embodiment, for example, a digital VGA scales digital input values within the logarithmic domain using logarithmic gain values in units of decibels. In that case, the gain values can be provided to the adder without any conditioning or conversion.

The invention may also significantly reduce memory requirements in a digital VGA by using techniques to reduce the size of one or more LUTs implemented in the digital VGA. In particular, an exponential conversion unit may saturate a baseband signal in the logarithmic domain prior to converting the baseband signal back into a linear domain. The saturation prior to lookup can reduce the size (i.e., width) of the individual entries in the LUT, thus reducing the amount of memory required for the LUT. In addition, a logarithmic conversion unit may utilize different LUTs for the exponent and the mantissa of a floating point number, as described in detail below, which can drastically reduce memory requirements. In particular, only a portion of the mantissa values may be stored in the mantissa LUT, and the additional values can be generated or approximated as needed.

Additional details of these and other embodiments are set forth in the accompanying drawings and the description below. Other features, objects and advantages will become apparent from the description and drawings, and from the claims.

DETAILED DESCRIPTION

Figure 1:
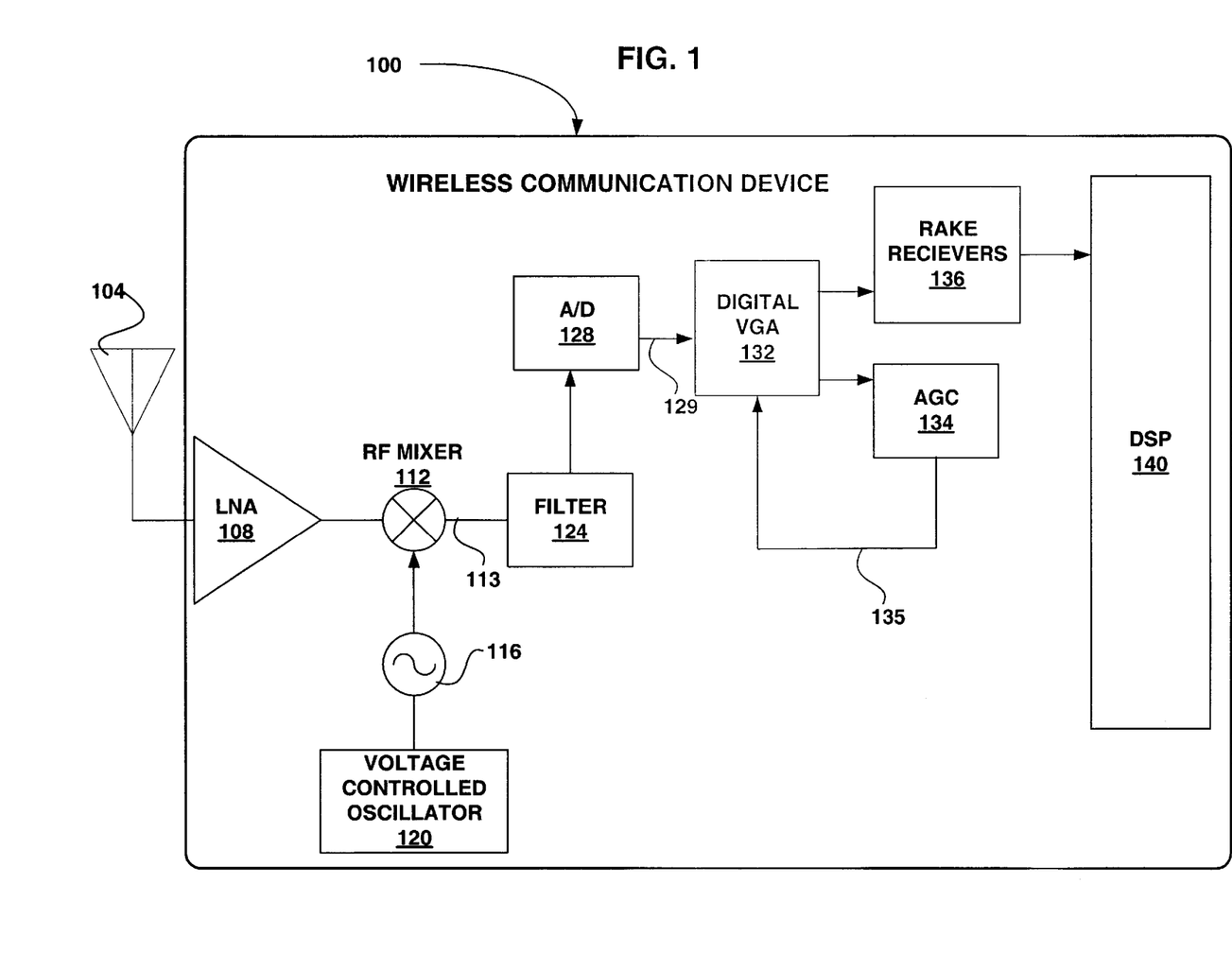
FIG. 1 is a block diagram illustrating a wireless communication device according to the invention.

FIG. 1 is a block diagram of an exemplary wireless communication device (WCD) 100 according to the invention. Although not so limited, various embodiments of the invention are described in reference to a receiver of wireless communication device that implements the Zero IF architecture, as illustrated in baseband signals and, specifically, does not first convert the RF signals to IF signals.

WCD 100 includes antenna 104 that receives incoming RF signals. For example, the incoming RF signals may comprise code division multiple access (CDMA) modulated signals sent from a CDMA base station. An RF signal received by antenna 104 can be passed through low-noise amplifier (LNA) 108 before being mixed down to baseband by RF mixer 112. For example, RF mixer 112 may receive carrier waveforms produced by frequency synthesizer 116 that utilize a local clock of WCD 100 as a timing reference. The local clock, for instance, may comprise a voltage controlled oscillator 120, such as a voltage controlled temperature compensated crystal oscillator (VCTCXO). As desired, WCD 100 may also include additional components (not shown).

RF mixer 112 produces baseband signal 113, which can be filtered, e.g., by filter 124, and sampled by analog to digital (A/D) converter 128 to produce corresponding digital values of the signal, e.g., digital baseband signal 129. Digital VGA 132 scales digital baseband signal 129, either by amplifying or attenuating the digital values according to logarithmic gain value 135 received from automatic gain control unit (AGC) 134.

After scaling by digital VGA 132, the scaled digital baseband signal is provided to rake receivers 136, which separate and track signals received from different sources, e.g., different base stations. For example, rake receivers 136 may include a number of "fingers" that perform despreading, Walsh decovering and accumulation, pilot time and frequency tracking. Each finger outputs pilot and data symbols for the corresponding path to digital signal processor (DSP) 140. DSP 140 then performs symbol demodulation and/or other signal processing.

As described above, although the Zero IF architecture eliminates the need for IF components, the architecture has typically required conventional devices to incorporate more complicated baseband components. However, unlike a conventional digital VGA that may implement a relatively wide multiplier, digital VGA 132 operates in a logarithmic domain. In particular, digital VGA 132 scales digital baseband signal 129 within the logarithmic domain, and in accordance with the logarithmic gain value 135 received from AGC 134. In this manner, digital VGA 132 does not incorporate a complex and expensive multiplier, but utilizes a more simple and relatively low cost adder. In addition, because digital VGA 132 operates in the logarithmic domain, the gain value 135 received from AGC 134 may be used without conversion to a linear value, thus removing the need for the conventional lookup table (LUT) used for that purpose.

As discussed in further detail below, digital VGA 132 may utilize a logarithmic conversion unit (not shown in FIG. 1) to convert digital baseband signal 129 from a linear domain to a logarithmic domain, and may utilize an exponential conversion unit (not shown) to convert a scaled baseband signal from the logarithmic domain back to the linear domain. The exponential conversion unit and the logarithmic conversion unit may utilize lookup tables. Additional techniques described below, however, can be used to reduce the size of the lookup tables and thus reduce memory requirements. In other embodiments, the exponential conversion unit and logarithmic conversion unit may utilize algorithms, possibly in combination with smaller sized lookup tables, to dynamically generate the appropriate conversion values.

Figure 2:
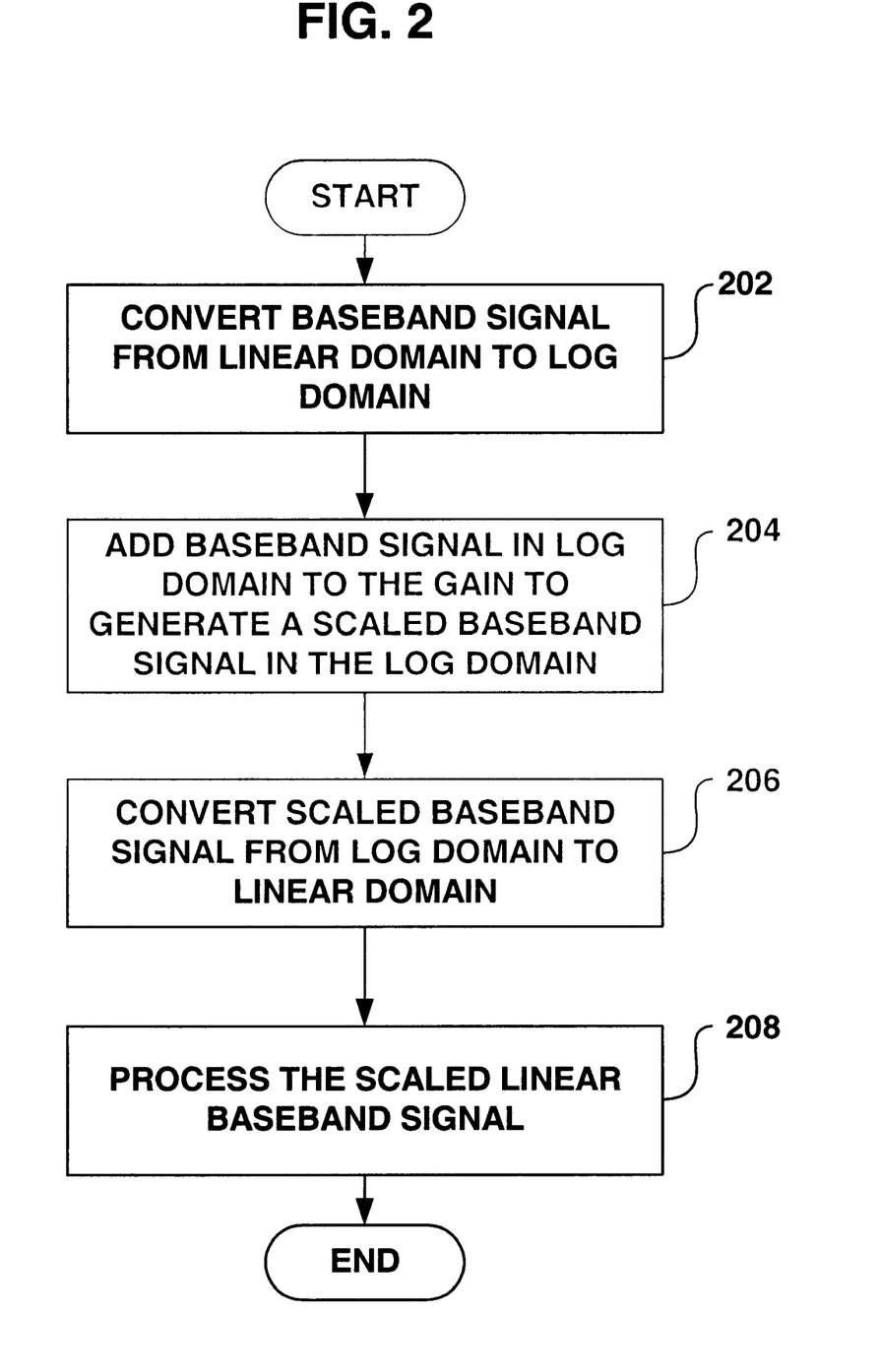
FIG. 2 is a flow diagram according to an embodiment of the invention.

FIG. 2 is a flow diagram illustrating a high-level process in which digital VGA 132 (FIG. 1) scales a baseband signal in the logarithmic domain. As shown, digital VGA 132 converts a linear baseband signal from a linear domain to logarithmic domain (202). As described in detail below, digital VGA 132 may incorporate a logarithmic conversion unit that makes use of lookup tables to perform the conversion. The logarithmic domain may have units of decibels scaled to the desired resolution so that conversion of the gain values can be avoided. For example, a resolution of $\frac{2}{15}$ dB may be used in a WCD, corresponding to the defined resolution of the gain.

Digital VGA 132 adds the baseband signal in the logarithmic domain to gain values received from AGC 134, thereby generating a scaled baseband signal in the logarithmic domain (204). The scaled baseband signal may be, for example, amplified or attenuated depending on the gain values. Digital VGA 132 converts the scaled baseband signal back from the logarithmic domain to the linear domain (206). Digital VGA 132 may incorporate an exponential conversion unit that makes use of lookup tables to perform the conversion. The scaled linear baseband signal can then be processed, for example, by rake receivers 136 and digital signal processor 140 (208).

Figure 3:
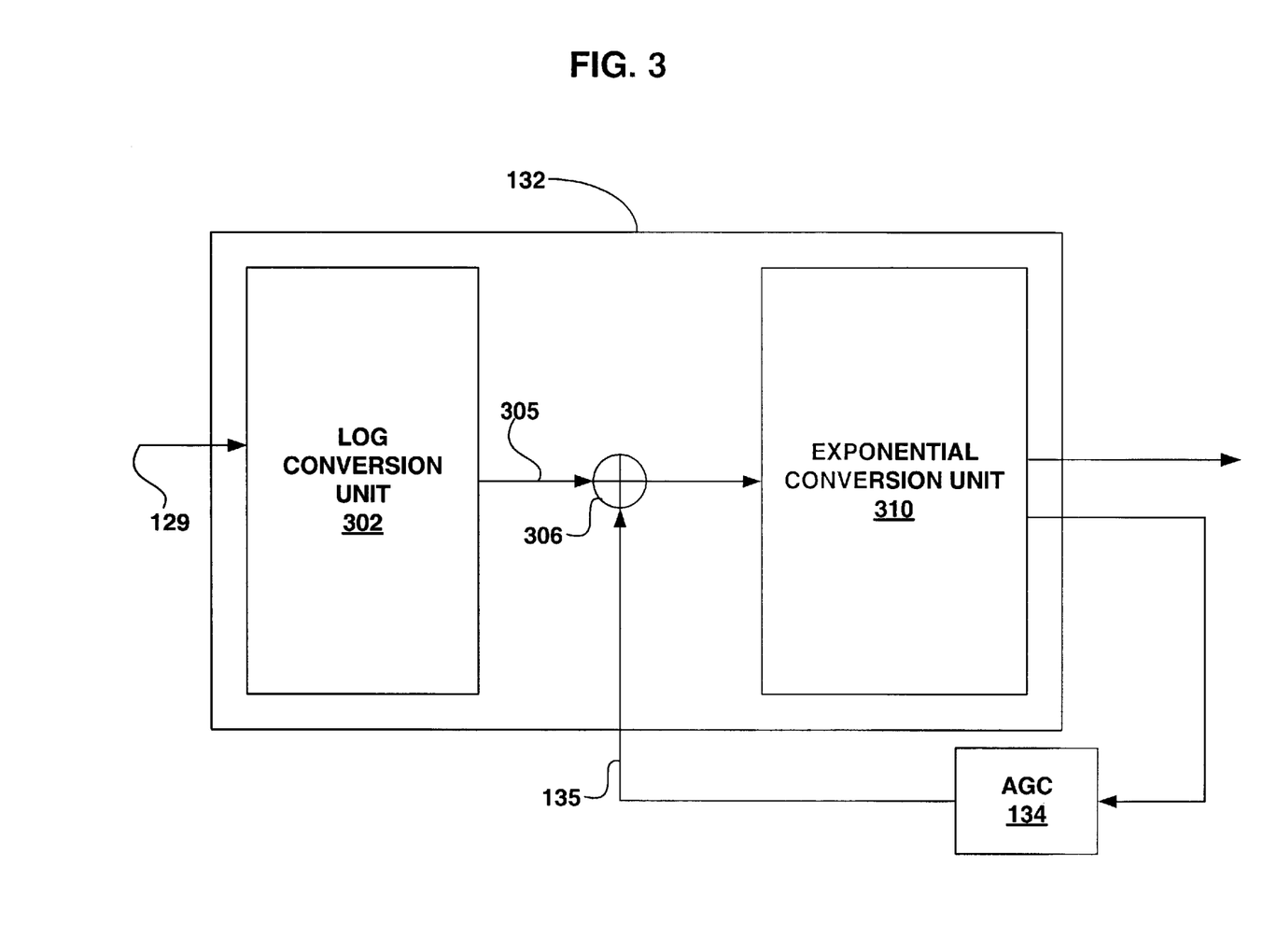
FIG. 3 is a block diagram illustrating an embodiment of digital VGA according to the invention.

FIG. 3 is a block diagram illustrating an example embodiment of digital VGA 132 that operates within the logarithmic domain. As shown, digital VGA 132 includes a logarithmic conversion unit 302 that converts an incoming linear baseband signal 129 into a logarithmic domain, such as by converting the linear digital values to logarithmic values 305 having units of decibels with a desired resolution. In one embodiment, logarithmic conversion unit 302 includes a logarithmic LUT that maps acceptable values for linear baseband signals to the logarithmic values. Such a LUT, however, can require significant memory space. For this reason, various additional techniques are described to reduce the size of the logarithmic LUT, and thereby reduce memory space requirements.

Digital VGA 132 includes an adder 306 rather than a conventional multiplier. In particular, digital VGA 132 exploits the logarithmic domain, and replaces the multiplication function with addition. In other words, digital VGA 132 exploits the fact that Log (X*Y)=Log (X)+Log (Y), to effectively replace a multiplier with adder 306. WCD 100, however, may further process the amplified baseband signal in the linear domain. Therefore, digital VGA 132 may also include an exponential conversion unit 310 to convert the baseband signal back into the linear domain after it has been scaled.

The gain of digital VGA 132 can be controlled by feedback from AGC 134. In particular, AGC 134 may output a gain value 135 in the logarithmic domain, such as in units of decibels having the desired resolution. In this manner, digital VGA 132 need not convert the gain value 135 prior to application by adder 306. Rather, digital VGA 132 may amplify or attenuate linear baseband signal 129 accordingly, simply by adding the gain value 135 to linear baseband signal 129 in the logarithmic domain.

Exponential conversion unit 310 converts the scaled baseband signal from the logarithmic domain back to the linear domain. For example, the exponential conversion unit 310 may use one or more LUTs, as described in greater detail below. In addition, the techniques described below may be used to significantly reduce the size of the one or more exponential LUTs to reduce memory requirements.

In one particular case, digital VGA 132 operates in a logarithmic domain having units of decibels scaled to a desired resolution. As mentioned above, operating in a logarithmic domain having units of decibels can be particularly advantageous, because in that case the gain value generated by AGC 134 can be used without conversion. In other embodiments, however, the invention may operate in other logarithmic domains or non-linear domains. In still other embodiments, logarithmic conversion unit 302 and exponential conversion unit 310 implement algorithms in addition to, or as an alternative to, the various LUTs.

Figure 4:
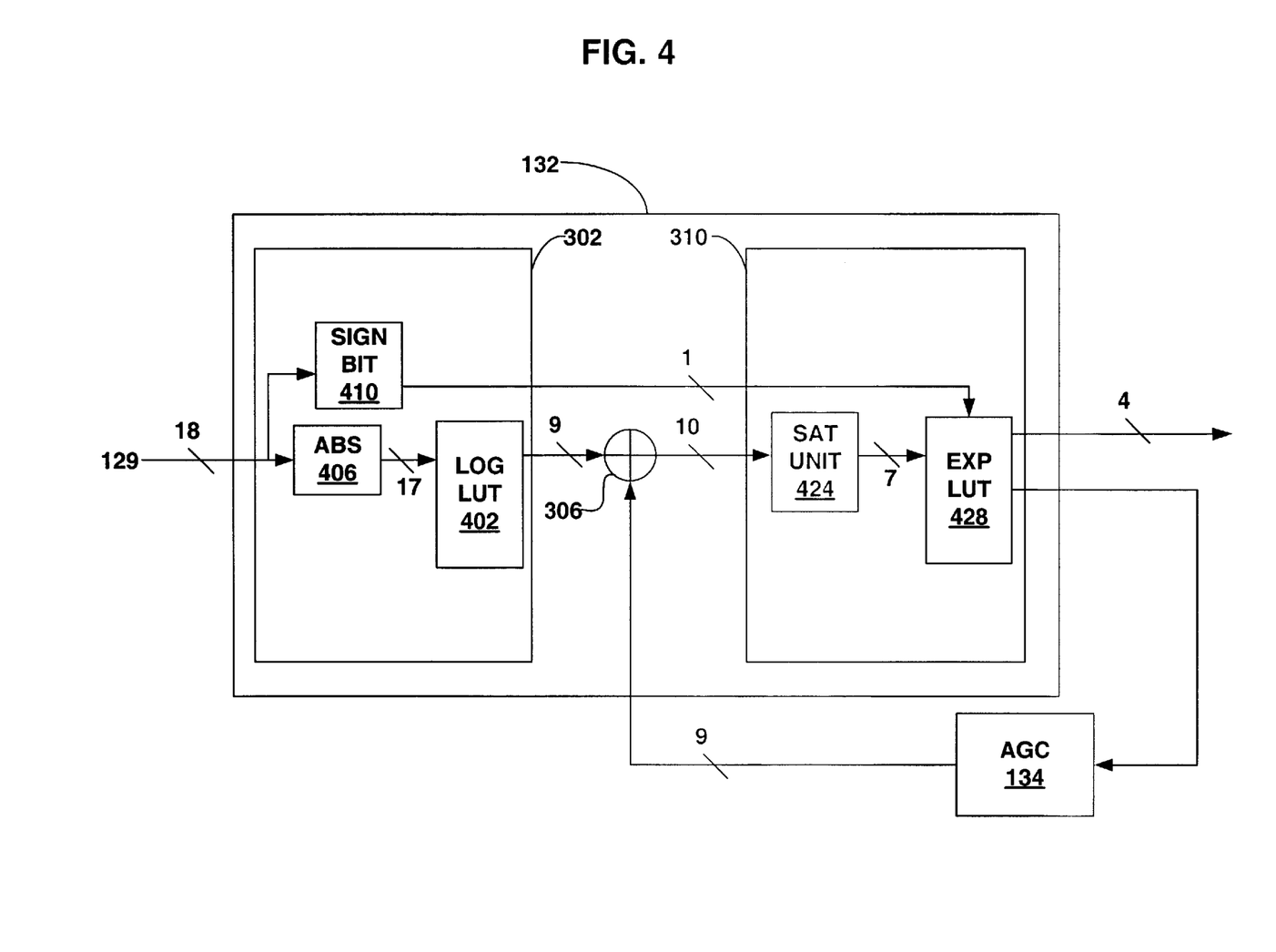
FIG. 4 is a block diagram, illustrating in greater detail, one embodiment of digital VGA.

FIG. 4 is a block diagram of one embodiment of digital VGA 132 illustrated in greater detail. In particular, logarithmic conversion unit 302 is illustrated as including a logarithmic lookup table (LOG LUT) 402. In addition, logarithmic conversion unit 302 includes hardware that separates an incoming signed baseband signal into an unsigned absolute value (ABS as shown at 406) and a sign bit (as shown at 410). In other words, the sign bit can be removed from the baseband signal within logarithmic conversion unit 302 and then propagated and reinserted in exponential conversion unit 310. The logarithm of a negative number is undefined. Thus, removing the sign bit from the baseband signal avoids the scenario where hardware within the digital VGA attempts to operate on negative numbers within the logarithmic domain. Rather, specific hardware within digital VGA 132 may operate only on positive numbers within the logarithmic domain once the sign bit has been removed.

In one particular example, A/D converter 128 (FIG. 1) produces the digital baseband signal 129 as an 18-bit binary number, including a sign bit, 7 integer bits, and 10 decimal bits. The sign bit is separated from the baseband signal and the remaining 17-bit binary number, including 7 integer bits and 10 decimal bits, is fed into LOG LUT 402. As a result of the lookup, the 17-bit binary number is converted into a 9-bit signed number, which is fed into adder 306. Adder 306 also receives a 9-bit signed number from AGC 134 representing a gain value in units of decibels with the desired resolution. Notably, the gain value is already in the logarithmic domain, and thus requires no adjustment prior to input into adder 306. Adder 306 adds the respective inputs to produce a 10-bit result, which is fed into exponential conversion unit 310. In one example, a relatively simple and low cost 9-bit adder is used.

Exponential conversion unit 310 may include saturation unit 424 and at least one exponential LUT 428. The saturation unit can be used to saturate the baseband signal in the logarithmic domain. For example, continuing with the example above, the 10-bit signed result, which is fed into exponential conversion unit 310, can be saturated to 7-bits by saturation unit 424 to span a dynamic range represented by 128 possible values. The output of saturation unit 424 is fed to exponential LUT 428 along with the sign bit (as shown at 410) to generate a 4-bit signed result representing the scaled baseband signal in the linear domain. Performing saturation prior to the lookup in exponential LUT 430 can save memory space by reducing the required size of individual entries in exponential LUT 430. Moreover, truncation operations can be incorporated into exponential LUT 430. In other words, any conventional truncation operations that would need to follow a conventional multiplier type of VGA can be incorporated into exponential LUT 430 in accordance with the invention simply by defining the appropriate bitwidth of the output of exponential LUT 430.

Figure 5A:
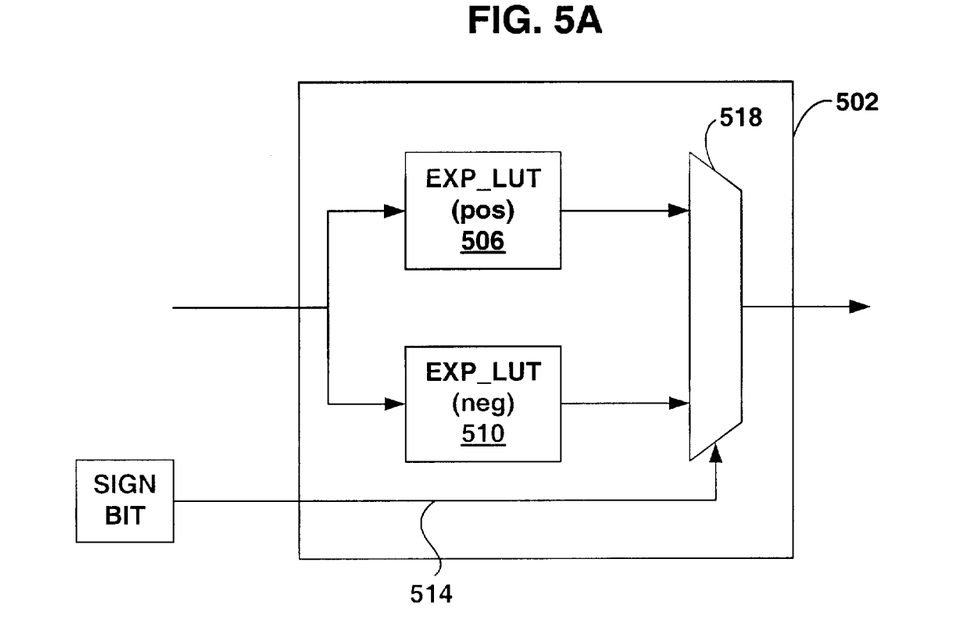
FIGS. 5A–5C illustrate three different exemplary embodiments of an exponential conversion unit according to the invention.
Figure 5B:
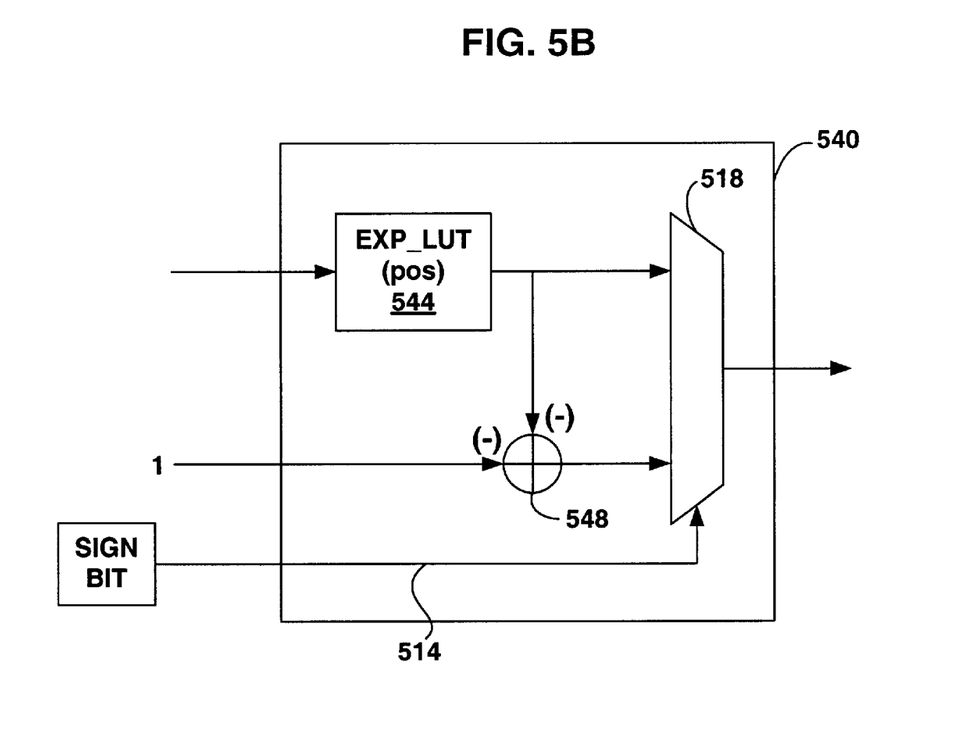
Figure 5C:
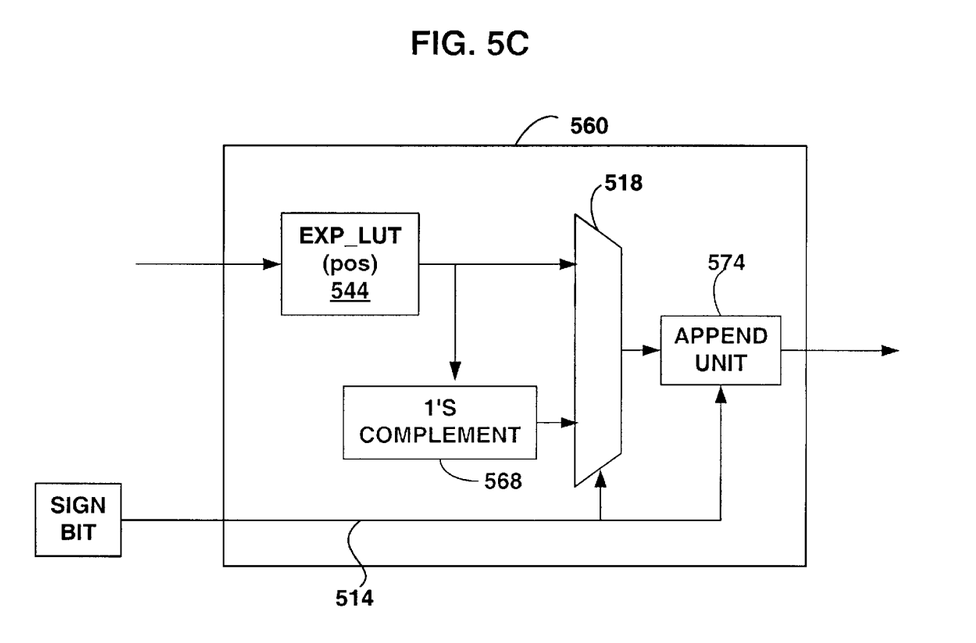

FIGS. 5A–5C illustrate three different exemplary embodiments of an exponential conversion unit according to the invention. The saturation unit 424 illustrated in FIG. 4 is not shown in FIGS. 5A–5C, but could be included for saturation prior to the lookups to reduce the size of one or more LUTs within the exponential conversion unit. In addition, entries in the one or more LUTs within the exponential conversion unit may have output bit-widths that effectively truncate digital input signals.

The exponential conversion unit 502 illustrated in FIG. 5A, includes different LUTs for positive and negative values. In particular, exponential conversion unit 502 includes EXP_LUT(pos) 506 that stores the 128 possible positive 3-bit values, and also includes EXP_LUT(neg) 510 that stores the 128 possible negative 4-bit values. The sign bit (as shown at 410) is used to provide input signal 514 used by multiplexer 518 to select output from the appropriate LUT. Thus, when the sign bit identifies a negative number, multiplexer 518 selects output from EXP_LUT(neg) 510. When the sign bit identifies a positive number, multiplexer 518 selects output from EXP_LUT(pos) 506.

FIG. 5B illustrates yet another configuration of an exponential conversion unit. In particular, exponential conversion unit 540, as illustrated in FIG. 5B, uses a single EXP_LUT(pos) 544 and replaces the EXP_LUT(neg) with an adder 548 that is used to generate the complimentary negative value from a positive value read from EXP_LUT(pos) 544. For example, given a positive value X stored in EXP_LUT(pos), the complimentary negative value may be generated by the appropriate complimentary equation, in one case (−X−1). In other cases, however, where the negative and positive values are perfectly symmetric about a Y-axis, the twos-complement equation of −X+1, or the like, may be used to generate the negative values from the positive values.

Exponential conversion unit 540, as illustrated in FIG. 5B, can provide advantages by further reducing memory requirements. In particular, exponential conversion unit 540 utilizes a single 128-bit by 3-bit LUT, and adder 548. Exponential conversion unit 502 as illustrated in FIG. 5A, on the other hand, requires more memory space, but eliminates the additional adder. Each of the embodiments of FIGS. 5A and 5B has advantages and disadvantages, which can be considered in determining the best configuration for a given implementation.

FIG. 5C illustrates still another configuration of an exponential conversion unit. Like the embodiment of FIG. 5B, exponential conversion unit 560 illustrated in FIG. 5C uses a single EXP_LUT(pos) 544. However, exponential conversion unit 560 generates negative values by inverting bits selected from EXP_LUT(pos) 544 and appending the sign bit. One's complement unit 568 can be used to perform the inversion and append unit 574 can be used to append the sign bit after multiplexer 518 selects the desired output. The embodiment of FIG. 5C avoids the need for an EXP_LUT (neg) as illustrated in FIG. 5A and also avoids the need for an adder as illustrated in FIG. 5B.

Figure 6:
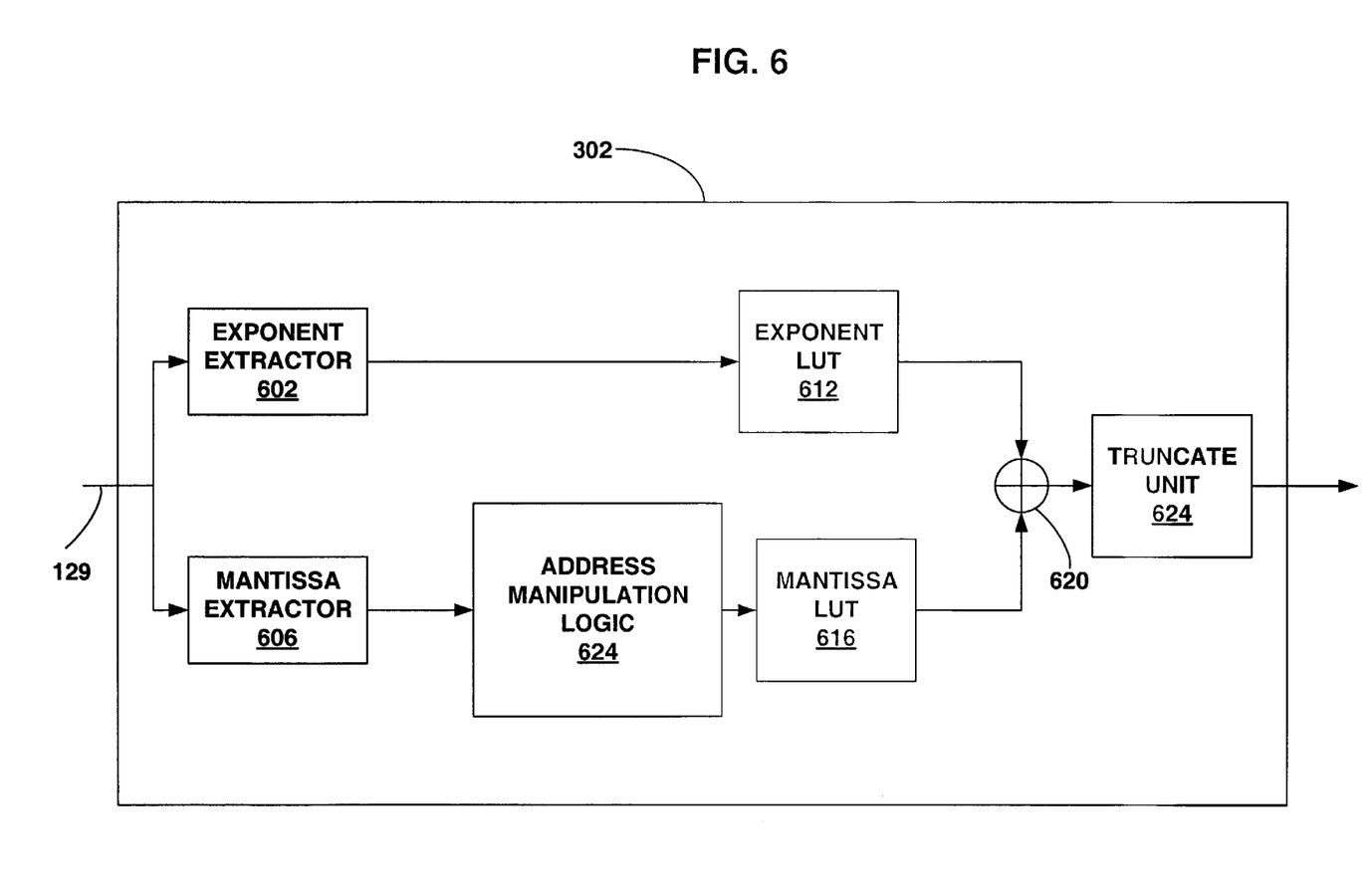
FIG. 6 is a block diagram, illustrating in greater detail, one implementation of a logarithmic conversion unit.

FIG. 6 is a block diagram, illustrating in greater detail, one implementation of logarithmic conversion unit 302. As mentioned above, logarithmic conversion unit 302 is used to convert digital values of a signal, e.g., an incoming linear baseband signal 129, into a logarithmic domain. While logarithmic conversion unit 302 can be realized by implementing a single LUT that maps acceptable values for linear baseband signal to the logarithmic domain, an alternative configuration, as illustrated in FIG. 6, can significantly reduce memory requirements.

In particular, as illustrated in FIG. 6, logarithmic conversion unit 302 includes various hardware for manipulating a floating point number. For example, an N-Bit positive binary number X(p) can be expressed as $X(p)=m* 2^E$, where E is referred to as the exponent and represents the position of the most significant bit in X(p) that is set to a one, and m is referred to as the mantissa and represents the remaining E−1 least significant bits.

In a logarithmic domain having decibel units, the above floating point equation can be expressed as:

$$20. \log(X(p)/2^{10}).R_{dB}=20. \log(2^E/2^{10}).R_{dB}+20. \log(m).R_{dB},$$

where $R_{dB}$ is the inverse of the desired decibel resolution. The floating point equation in the logarithmic domain in decibel units can then be expressed as:

$$X=X_E+X_m,$$

where $X_E$ is the decibel value of the exponent and $X_m$ is the decibel value of the mantissa.

In this particular domain, $X_E$ can be stored as a table of N=17 entries, where each entry is 9-bits wide. Furthermore, $X_m$ can be thought of as N segments. However, only one of the segments needs to be stored as a table, and values for all other segments can be derived from entries of the stored segment. For example, the $m^{th}$ segment includes $2^{m-1}$ elements, each of which can be derived from an element of the $(m+n)^{th}$ segment by left-shifting the input address of the (m+n)th segment by n-bits. In addition, a nearest neighbor interpolation can be performed to derive elements of the $(m+n)^{th}$ segment from elements of the $m^{th}$ segment. In particular, to interpolate an element of the $(m+n)^{th}$ segment from an element of the $m^{th}$ segment, the input address of the $m^{th}$ segment can be rounded by n-bits and used as the input address of the $(m+n)^{th}$ segment.

Referring again to FIG. 6, logarithmic conversion unit 302 may include an exponent extractor 602 and a mantissa extractor 606. An exponent LUT 612 can be used to generate the logarithmic value of the exponent. In addition, a mantissa LUT 616 can be used to generate the logarithmic value of the mantissa. These values can then be combined by adder 620, and possibly truncated by truncate unit 624.

In one embodiment, mantissa LUT 616 maps all possible values of the various mantissa segments. However, to reduce the size of mantissa LUT 616 and thereby reduce memory requirements, address manipulation logic 624 can be implemented to allow values of one segment of the mantissa to be generated from a different segment of the mantissa. In this manner, only a single segment of the mantissa can be stored in mantissa LUT 616.

Address manipulation logic 624 may operate as follows. Assuming that mantissa LUT 616 includes $2^U$ entries, then if E>U, let input address M'=round $(M/2^{(E-U)})$, and if E≦U, let M'=<<(U−E).

In other words, if E>U, then M' is interpolated and defined as the nearest neighbor input address in the stored mantissa LUT 616, and if E≦U, M' is obtained by left shifting the input address by (U−E) bits. M' can then be fed into the stored segment to yield the appropriate converted value in the logarithmic domain.

Figure 7A:
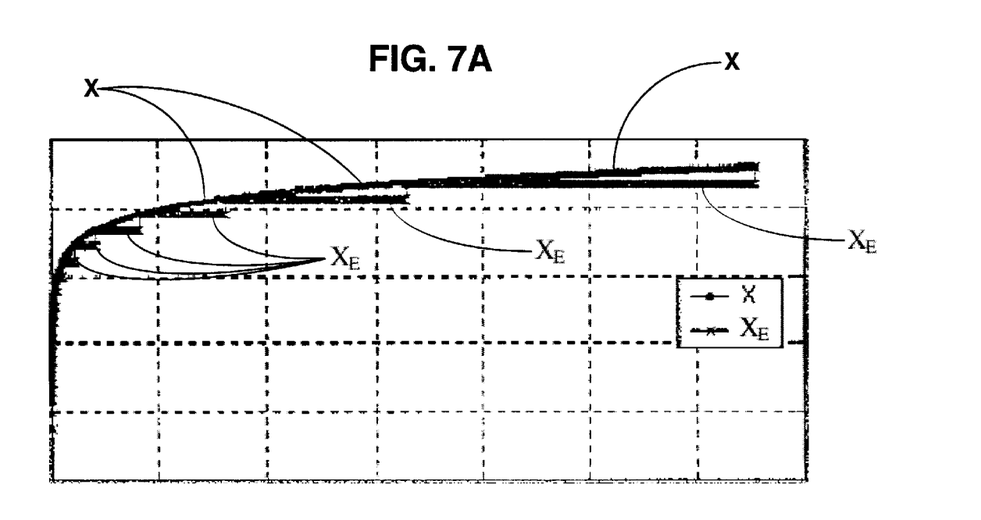
FIGS. 7A and 7B are a series of two graphs that further illustrate the concept behind the embodiment of logarithmic conversion unit illustrated in FIG. 6.
Figure 7B:
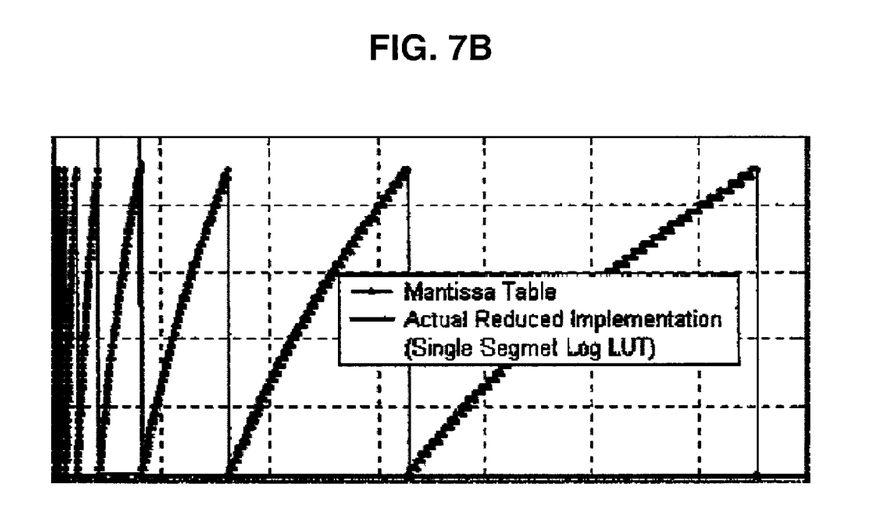

FIGS. 7A and 7B are a series of two graphs that further illustrate the concept behind the embodiment of logarithmic conversion unit 302 illustrated in FIG. 6. Again, the floating point equation in the logarithmic domain having decibel units can be expressed as $X=X_E+X_m$, where $X_E$ is the decibel value of the exponent and $X_m$ is the decibel value of the mantissa. FIG. 7A is a graph of the decibel value of X as a function of linear input, in comparison to a graph of the decibel value of $X_E$ for the same input. As can be seen in FIG. 7A, the value of $X_E$ deviates slightly from the value of X at various different inputs.

FIG. 7B is a graph of the decibel value of $X_m$. $X_m$ can be viewed as the variation between X and $X_E$ at the various different inputs. Thus, as shown in FIG. 6, X can be generated from exponent LUT 612 and mantissa LUT 616. In particular, exponential LUT 612 is used to generate the logarithmic value of the exponent, and mantissa LUT 616 is used to generate the logarithmic value of the mantissa. Importantly, however, to save memory space, mantissa LUT 616 need only store entries for one of the spikes (i.e. segments) illustrated in FIG. 7A. The values of the other spikes can then be generated using address manipulation logic 624 as described above.

The segment (or spike as illustrated in FIG. 7B) that is stored in mantissa LUT 616 can be chosen depending on the level of accuracy required. For example, the full logarithmic mantissa table can be derived without any loss by storing the last segment (in this case the $17^{th}$ segment). However, that would result in the LUT having $2^{17-1}=65,536$ entries. Notably, because logarithmic functions tend to flatten at large inputs, a much smaller segment can be chosen without a significant loss in performance in a wireless communication device. In particular, experiments have showed that storing the $7^{th}$ segment yields acceptable approximations for all inputs. This would require a mantissa LUT having only $2^{7-1}=64$ entries.

Choosing a relatively small numbered segment for inclusion in the mantissa table effectively results in non-uniform sampling over the logarithmic function. At lower inputs, e.g., in lower segments, where the logarithmic function changes relatively rapidly, all values in lower numbered segments can be generated from the larger numbered segment. However, at higher inputs, where the logarithmic function changes much more slowly, the values are interpolated from the stored segment. This can be viewed as a sort of nonuniform sampling of the logarithmic function, wherein at lower inputs more data points are preserved, but at higher inputs, fewer data points are preserved. Experiments have shown that such non-uniform sampling does not result in significant performance reduction in a WCD.

To account for any unexpected variables, such as quantization noise, the resolution of both exponent LUT 612 and mantissa LUT 616 can be increased by K-bits to help insure that the data is correct and non-corrupted. Quantization noise may be introduced whenever a floating point LOG function is represented by finite bit-width digital numbers. Experiments have showed that increasing the resolution of exponent LUT 612 and mantissa LUT 616 by K=3 bits can be sufficient to compensate for quantization noise in a WCD.

Figure 8:
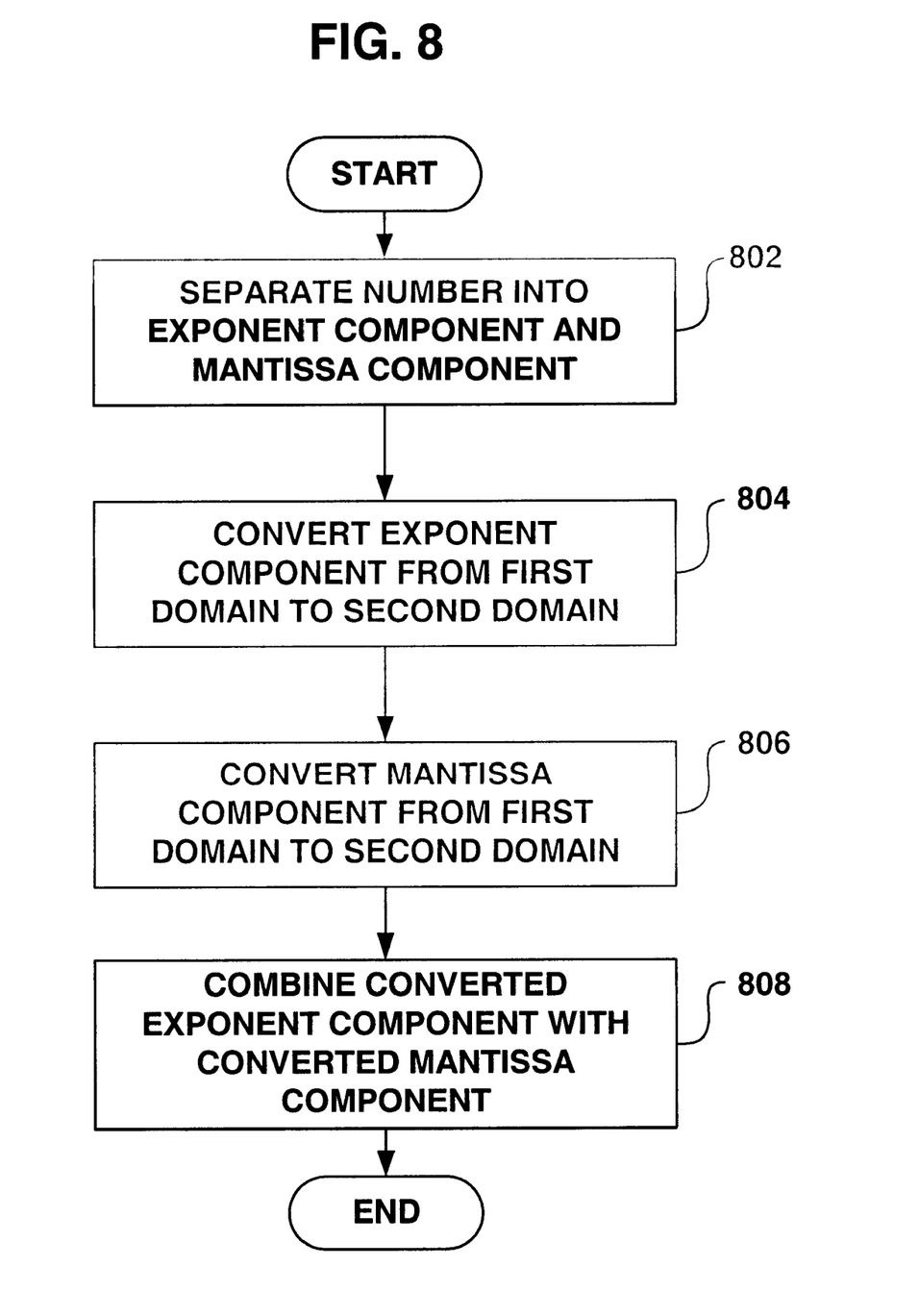
FIGS. 8 and 9 are flow diagrams according to the invention.

FIG. 8 is a flow diagram illustrating a process that can be used to reduce memory requirements when implementing one or more LUTs. The process illustrated in FIG. 8 may be particularly effective when used in a WCD, but is not so limited. For example, the process of FIG. 8 may be used in any computer device implementing lookup tables.

As shown, a number is separated into an exponent component and a mantissa component in a first domain (802). For example, the first domain may be a linear domain and the number may be binary floating point number representing digital values of a signal. In that case, the exponent component can be extracted from the number simply by identifying and storing the most significant bit that is set to one. Similarly, the mantissa component can be extracted from the number simply by storing the remaining least significant bits.

The exponent component can be converted from the first domain to a second domain, such as a non-linear domain (804). Separately, the mantissa component can be converted from the first domain to the second domain (806). In one particular case, the second domain is a logarithmic domain having units of decibels with the desired resolution. Once converted to the second domain (804 and 806), the exponent and mantissa components can be combined (808). For example, an adder can be implemented to facilitate the combination simply by summing the exponent and mantissa components. If desired, the combination can then be truncated or rounded.

The conversion of the exponent component can be done using a first LUT, e.g., an exponent LUT. Similarly, the conversion of the mantissa component can be done using a second LUT, e.g., a mantissa LUT. Alternatively, either or both of the conversions may be achieved using an algorithm, or an algorithm and a LUT in combination.

The exponent LUT may be relatively small, and may have entries corresponding to the possible bit positions of the exponent. For example, if the number is a 17-bit number, the exponent LUT may have only 17 entries. The mantissa LUT, on the other hand, may include a much larger number of entries. For example, if the number is a 17-bit number, the mantissa LUT could include an extremely large number of entries. For this reason, additional techniques can be used to further reduce the size of the mantissa LUT, and thus save memory space.

Figure 9:
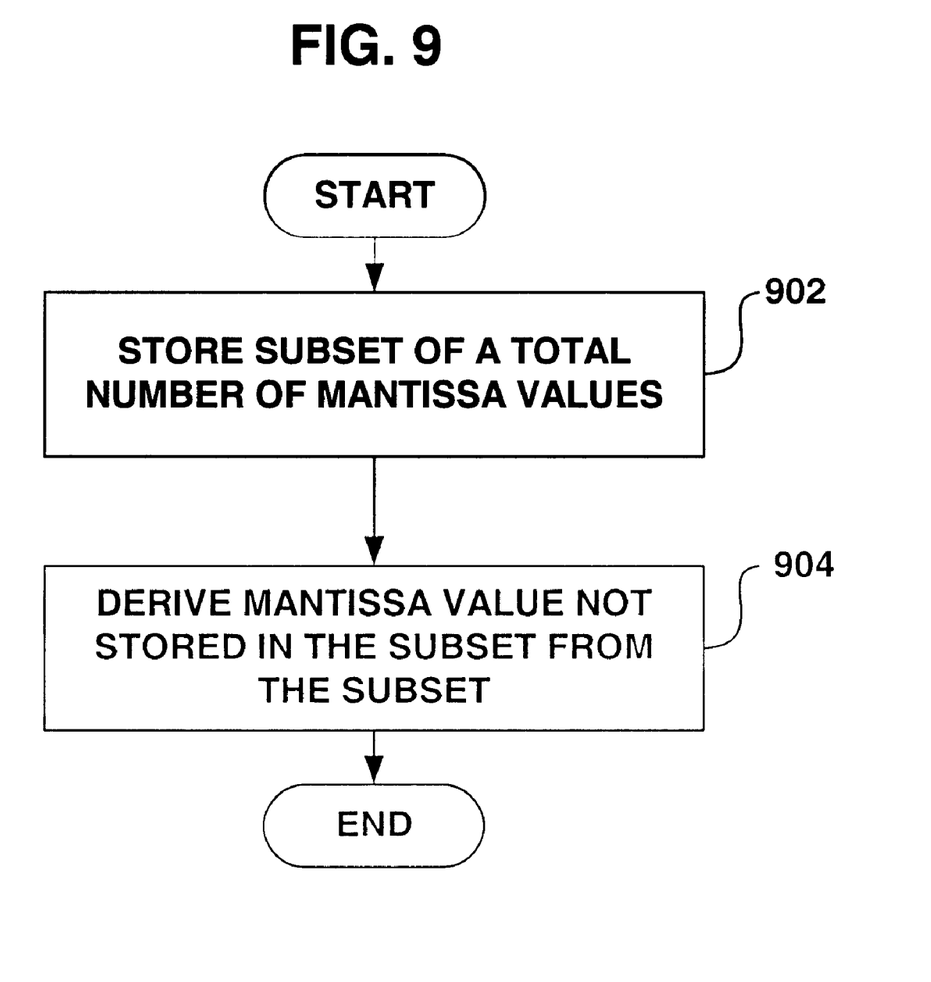

FIG. 9 is a flow diagram illustrating a process that can be used to significantly reduce the size of the mantissa LUT. As shown, only a subset of a total number of mantissa values are stored in the mantissa table (902). Values not included in the subset can then be derived from the subset (904). In this manner, the memory requirements for implementing a mantissa LUT can be reduced.

Referring again to FIG. 7B, the subset of mantissa values may correspond to one of the spikes illustrated in FIG. 7B. The values in all of the other spikes can be generated either by shifting the input and selecting an entry in the subset based on the shifted input, or by interpolating input and selecting an entry in the subset based on the interpolated input. If a value in a smaller numbered mantissa segment is needed (i.e., a segment located to the left of the stored segment in FIG. 7B), the shifting operation can be used. If a value in a larger number mantissa segment is needed (i.e., a segment located to the right of the stored segment in FIG. 7B), the interpolation operation can be used. In this manner, the total number of possible mantissa values can be generated, as needed, from a much smaller subset of mantissa entries stored in a table, thus saving memory space.

In particular, if a value in a larger number mantissa segment is needed, the input address of that value is interpolated and defined as the nearest neighbor input address within the stored mantissa segment. If a value in a smaller numbered mantissa segment is needed, the input address of that value is left shifting by a number of bits corresponding to the difference between the number of the stored segment and the number of the segment for the desired value. The interpolated address or shifted address can then be fed into the stored segment to yield the appropriate converted value.

As mentioned above, the particular subset is stored in the mantissa LUT can be chosen depending on the level of accuracy required. Notably, because logarithmic functions tend to flatten at large inputs, a small segment can be used without a significant loss in performance in a wireless communication device. In particular, experiments showed that storing the $7^{th}$ segment yielded acceptable approximations for all inputs. This would require a mantissa LUT having only $2^{7-1}=64$ entries.

In still other embodiments, a somewhat larger mantissa LUT, including entries that comprise non-uniform sampling of the logarithmic or logarithmic like functions can be used. For example, the entries could be pre-computed using the techniques described above. In other words, a segment of the mantissa could be selected and all of the values in smaller segments could be pre-computed and included within the LUT. However, for larger segments, the entries could be pre-computed according to the interpolation technique described above. In this manner, every segment stored within the LUT would have no more entries than the chosen segment, thus limiting the amount of required memory space. Although the mantissa L.UT would be larger than a LUT storing only the single segment, the address manipulation logic would not be needed. In designing a particular implementation, the additional memory space required can be weighed against the inclusion of address manipulation logic to determine the best, or most efficient configuration.

The various LUTs described above may be stored in memory and accessed as needed. In some cases, methods described above may be implemented in software, such as program code. For example, the program code can be loaded into memory and then executed in a processor. The program code can be initially carried on computer-readable media such as a hard drive or magnetic, optical, magneto-optic, phase-change, or other disk or tape media. Alternatively, the program code may be loaded into memory from electronic computer-readable media such as EEPROM, or downloaded over a network connection. If downloaded, the program code may be initially embedded in a carrier wave or otherwise transmitted on an electromagnetic signal. The program code may be embodied as a feature in an application program providing a wide range of functionality.

If the invention is implemented in program code, the processor that executes the program code may take the form of a microprocessor and can be integrated with or form part of a PC, Macintosh, computer workstation, hand-held data terminal, palm computer, WCD, wireless base station, network router, or the like. The memory may include random access memory (RAM) storing program code that is accessed and executed by processor to carry out the various method described above.

Various embodiments of the invention have been described. For example, a digital VGA has been described for use in a WCD. In particular, the digital VGA operates within the logarithmic domain, and replaces a conventional multiplier and a conventional exponential lookup table having a size greater than 1000 bytes, with an adder, logarithmic LUTs of nominal size (i.e. approximately 200 bytes of total space) and a smaller exponential table of nominal size (i.e. approximately 128 bytes). Nevertheless, various modifications may be made without departing from the spirit and scope of the invention. For example, rather than implementing lookup tables, the invention could be realized using algorithms that dynamically convert from logarithmic domains to linear domains, and/or vice versa. In addition, the invention could be implemented in other logarithmic domains. Moreover, the digital VGA according to the invention could be used in other devices, including, for example, a base station within a wireless communication network. For example, any device that implements a multiplier followed by some sort of truncation may benefit from the invention.

In addition, aspects of the invention could be used in applications other than digital VGA's. For example, any apparatus that performs a multiplication operation followed by a truncation operation could use aspects of the invention to replace a conventional multiplier with an adder. In one case, the invention can be implemented to multiply two baseband signals using an adder rather than a multiplier. In general, the invention can perform multiplication and truncation by converting linear digital values to a logarithmic domain, adding the digital values in the logarithmic domain and then converting the added value back to a linear domain. Moreover, a truncation operation can be incorporated into a lookup table that is used to convert back to the linear domain simply by choosing output bit-widths to effectively truncate the signals.

Various techniques for reducing the size of LUTs so as to reduce memory requirements have also been described. In particular, many of these techniques have been described in the context of a WCD. However, the invention is not limited in that respect. For example, the techniques used to reduce the size of one or more LUTs could also be used in other computer devices to save memory space. Accordingly, these and other embodiments are within the scope of the following claims.

What is claimed is:

1. An apparatus comprising:
   a logarithmic conversion unit that converts a first digital signal from a linear domain to a logarithmic domain;
   an adder that sums the converted first digital signal with a second digital signal to produce a scaled digital signal; and
   an exponential conversion unit that converts the scaled digital signal from the logarithmic domain to the linear domain;
   wherein the apparatus is a digital voltage gain amplifier and the second digital signal is a gain signal;
   wherein the logarithmic domain has decibel units in a same resolution as the gain.

2. The apparatus of claim 1, wherein the first digital signal is a baseband signal.

3. The apparatus of claim 1, wherein the first digital signal is a first baseband signal and the second digital signal is a second baseband signal.

4. The apparatus of claim 1, wherein the logarithmic conversion unit includes a logarithmic lookup table.

5. The apparatus of claim 2, wherein the logarithmic conversion unit includes a truncate unit that truncates the first digital signal in the logarithmic domain.

6. The apparatus of claim 1, wherein the scaled digital signal is an attenuated signal having a value less than the first digital signal.

7. The apparatus of claim 1, wherein the scaled digital signal is an amplified signal having a value greater than the first digital signal.

8. An apparatus comprising:
   a logarithmic conversion unit that converts a first digital signal from a linear domain to a logarithmic domain;
   an adder that sums the converted first digital signal with a second digital signal to produce a scaled digital signal; and
   an exponential conversion unit that converts the scaled digital signal from the logarithmic domain to the linear domain;
   wherein the exponential conversion unit includes an exponential lookup table;
   wherein entries in the exponential lookup table have output bit-widths that effectively truncate the scaled digital signal, wherein the adder is a first adder, and wherein the exponential conversion unit further includes a second adder and a multiplexer, wherein the exponential lookup table provides first input to the second adder and the multiplexer, wherein the second adder provides second input to the multiplexer, and wherein the multiplexer selects the first or second input based on sign, wherein the selected input in the scaled digital signal in the linear domain.

9. The apparatus of claim 8, wherein the first input is positive input and the second is negative input.

10. The apparatus of claim 8, wherein the logarithmic lookup table includes entries that comprise a non-uniform sampling of a logarithmic function.

11. An apparatus comprising:
a logarithmic conversion unit that converts a first digital signal from a linear domain to a logarithmic domain;
an adder that sums the converted first digital signal with a second digital signal to produce a scaled digital signal; and
an exponential conversion unit that converts the scaled digital signal from the logarithmic domain to the linear domain;
wherein the exponential conversion unit includes first and second exponential lookup tables coupled to a multiplexer.

12. The apparatus of claim 11, wherein the first exponential lookup table converts positive numbers and the second exponential lookup table converts negative numbers.

13. An apparatus comprising:
a logarithmic conversion unit that converts a first digital signal from a linear domain to a logarithmic domain;
an adder that sums the converted first digital signal with a second digital signal to produce a scaled digital signal; and
an exponential conversion unit that converts the scaled digital signal from the logarithmic domain to the linear domain;
wherein the exponential conversion unit includes an exponential lookup table, and wherein the exponential conversion unit further includes a ones complement unit coupled to the exponential lookup table, and a multiplexer coupled to the ones complement unit and the exponential lookup table, wherein the multiplexer selects input based on sign.

14. An apparatus comprising:
a logarithmic conversion unit that converts a first digital signal from a linear domain to a logarithmic domain;
an adder that sums the converted first digital signal with a second digital signal to produce a scaled digital signal; and
an exponential conversion unit that converts the scaled digital signal from the logarithmic domain to the linear domain;
wherein the logarithmic conversion unit converts the first digital signal from the linear domain to the logarithmic domain by selecting a first number from the exponent lookup table, generating a second number by interpolating and selecting an entry from a mantissa lookup table based on the interpolation, and adding the first number to the second number.

15. A digital voltage gain amplifier comprising:
a logarithmic conversion unit that converts a baseband signal from a linear domain to a logarithmic domain, wherein the logarithmic conversion unit includes a logarithmic lookup table;
an adder that sums the converted baseband signal with a gain signal to produce a scaled baseband signal; and
an exponential conversion unit that converts the scaled baseband signal from the logarithmic domain to the linear domain, wherein the exponential conversion unit includes an exponential lookup table;
wherein the logarithmic lookup table includes entries that comprise a non-uniform sampling of a logarithmic function.

16. The amplifier of claim 15, wherein the logarithmic conversion unit includes an exponent lookup table and a mantissa lookup table.

* * * * *